(12) United States Patent
Cilli

(10) Patent No.: US 8,556,207 B2
(45) Date of Patent: Oct. 15, 2013

(54) HELICOPTER WITH COUNTER-ROTATING COAXIAL ROTORS WITHOUT CYCLIC VARIATION OF PITCH, EQUIPPED WITH MEANS FOR AERODYNAMIC CONTROL OF ATTITUDE AND FLIGHT PATH

(76) Inventor: Gianni Cilli, Rome (IT)

( * ) Notice: Subject to any disclaimer, the term of this patent is extended or adjusted under 35 U.S.C. 154(b) by 234 days.

(21) Appl. No.: 13/057,280

(22) PCT Filed: Jun. 26, 2009

(86) PCT No.: PCT/IT2009/000282
§ 371 (c)(1),
(2), (4) Date: Feb. 3, 2011

(87) PCT Pub. No.: WO2010/016080
PCT Pub. Date: Feb. 11, 2010

(65) Prior Publication Data
US 2011/0133022 A1    Jun. 9, 2011

(30) Foreign Application Priority Data
Aug. 4, 2008   (IT) .............................. RM2008A0424

(51) Int. Cl.
*B64C 27/10* (2006.01)
(52) U.S. Cl.
USPC ..................................... 244/17.19; 244/17.23
(58) Field of Classification Search
USPC ................... 244/7 B, 17.19, 17.23, 39, 12.5; 416/127
See application file for complete search history.

(56) References Cited

U.S. PATENT DOCUMENTS

| 1,345,159 | A | | 6/1920 | Freeman |
| 1,832,254 | A | | 11/1931 | Spanovic |
| 1,849,235 | A | | 3/1932 | Kibbe |
| 2,308,802 | A | * | 1/1943 | Barling .......................... 244/7 B |
| 2,466,821 | A | | 4/1949 | Owen |
| 2,487,020 | A | * | 11/1949 | Gilerease ...................... 416/127 |
| 2,606,622 | A | | 8/1952 | Bates |
| 3,135,481 | A | | 6/1964 | Sudrow |
| 3,554,467 | A | * | 1/1971 | Yowell ........................ 244/17.19 |
| 5,791,592 | A | | 8/1998 | Nolan et al. |
| 6,024,325 | A | | 2/2000 | Carter, Jr. |
| 6,086,016 | A | * | 7/2000 | Meek .......................... 244/17.11 |
| 2005/0236518 | A1 | | 10/2005 | Scott |

FOREIGN PATENT DOCUMENTS

| GB | 145 011 A | 4/1921 |
| GB | 623 582 A | 5/1949 |
| GB | 1 276 871 A | 6/1972 |

OTHER PUBLICATIONS

International Search Report, dated Nov. 2, 2010, from corresponding PCT application.

* cited by examiner

*Primary Examiner* — Timothy D Collins
*Assistant Examiner* — Brian M O'Hara
(74) *Attorney, Agent, or Firm* — Young & Thompson

(57) ABSTRACT

An aircraft with preferably coaxial counter-rotating sustaining rotors includes in combination: elements for variation of the collective pitch, i.e., for applying simultaneously one and the same variation to the incidence of all the blades of the rotors; and elements for controlling the attitude and direction of flight, which by generating appropriate aerodynamic forces via the sustaining rotor wind eliminate the need for the presence of elements for variation of the cyclic pitch of the blades of the rotors themselves.

17 Claims, 6 Drawing Sheets

HELICOPTER WITH COUNTER-ROTATING COAXIAL ROTORS WITHOUT CYCLIC VARIATION OF PITCH, EQUIPPED WITH MEANS FOR AERODYNAMIC CONTROL OF ATTITUDE AND FLIGHT PATH

It is known how in the history of helicopters the configuration with counter-rotating coaxial rotors, which are both separate and coaxial, preceded the single-rotor arrangement with a propeller for compensation of the torque, located at the rear on a purposely provided supporting beam or tail boom.

It is likewise known how the latter configuration subsequently prevailed, and still does prevail, as regards the number of examples produced, notwithstanding the former presents significant advantages as compared to the latter, such as greater aerodynamic efficiency, smaller encumbrance in plan view of the rotor area, and greater manoeuvrability of the machine. There exist in fact, certain elements that unfavourably affect the diffusion of the configuration with counter-rotating rotors, and particularly the one in which the rotors are coaxial.

One of the main disadvantages of counter-rotating coaxial rotors so far known is represented by the considerable complexity of the rotor members for controlling the blades, with particular reference to the transfer onto the two rotors of the variations of cyclic control of the pitch, and the need, in the absence of the anti-torque propeller, to achieve control of rotation of the machine on the axis of yaw by means of arrangements that enable change of the thrust of one rotor with respect to the thrust of the other. The latter arrangements are particularly demanding and complex, in so far as they are designed to differentiate the speed of rotation and/or the angle of incidence and/or the aerodynamic resistance of the blades of one rotor with respect to those of the other.

A first purpose of the present invention, which subverts radically the traditional conceptual approach to helicopter operation, is precisely that of overcoming the problems described above by removing these negative factors, simplifying to the maximum the structure of the machine and increasing both the mechanical reliability thereof and, by simplification the moving parts and marked reduction of the mechanical and aerodynamic loads applied thereto, the operating reliability, eliminating the critical aspects of certain manoeuvres, according to what will be clarified more fully hereinafter.

It should be noted that, at the current state of the art, in the helicopter field, but also throughout the prior history of this type of machines, there has constantly been applied the philosophy that assigns to the rotor system the generation of all the forces simultaneously necessary to the machine to sustain itself in flight and to enable its displacement in any desired direction.

The latter essential prerogative is currently obtained through the known system of cyclic variation of the pitch of the blades. To achieve these results it has proven necessary to adopt for the blades a relatively light structure such as to enable a rapid variation of their pitch at each turn of the rotor, in particular in the translated motions of the machine, which subjects the blades to what can only be described as a continuous vibratory "torment", both longitudinal and torsional. For some years now the attempt has been made to provide a remedy to said continuous mechanical stress of the blades by providing each blade with small active compensation fins, the automatic movement of which tends to reduce the vibrations by means of application of aerodynamic forces localized in appropriate points along the trailing edge of the blades themselves. Evidently, this remedy, however, also produces a further complication in the structure of the blades due to the need to add all the sensors and actuators necessary to achieve the desired results at least in part.

A further currently known problem is the particular and noisy beat produced by the cyclic variations of the pitch with the helicopter in fast translated flight, especially in inhabited areas and at low altitudes, in addition to the considerable and troublesome vibrations transferred onto the structure and felt also by the pilot and by the passengers.

Another purpose of the present invention is to overcome all the problems of the known art so far described.

The above has been achieved, according to the invention, by adopting an innovative technical solution in which the rotor system is assigned exclusively the sole function of sustaining the aircraft, whilst the generation and control of forces capable of causing and governing the translational movements in any direction is entrusted exclusively to some governing surfaces, which in what follows will be referred to as "ailerons", applied to the base of the fuselage and moved by the pilot with small and slow co-ordinated movements. Advantageously, according to the invention, the rotor system comprises two counter-rotating coaxial rotors equipped exclusively with means of regulation of the collective pitch and without means for regulation of the cyclic pitch.

A better understanding of the invention will be obtained from the ensuing detailed description and with reference to the attached figures, which illustrate purely by way of non-limiting example a preferred embodiment thereof.

Figure 11:
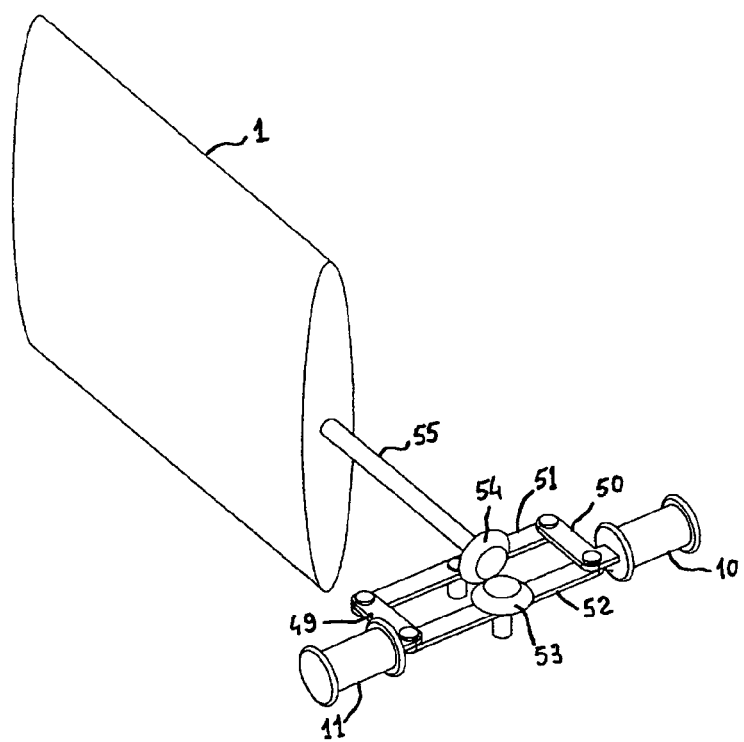
Figure 7:
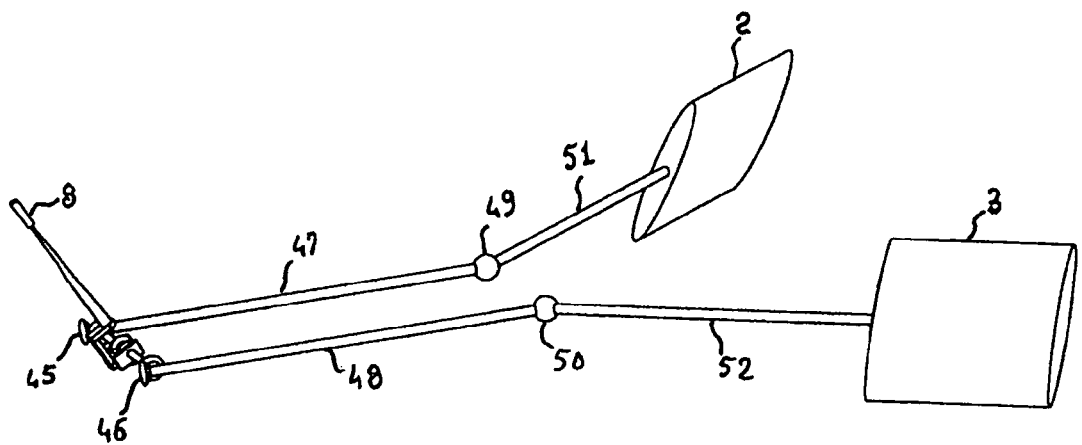
FIG. 7 shows the relation existing between the movement of the piloting lever forwards (as exerted by the pilot) and the corresponding position assumed by the two rear ailerons.
Figure 8:
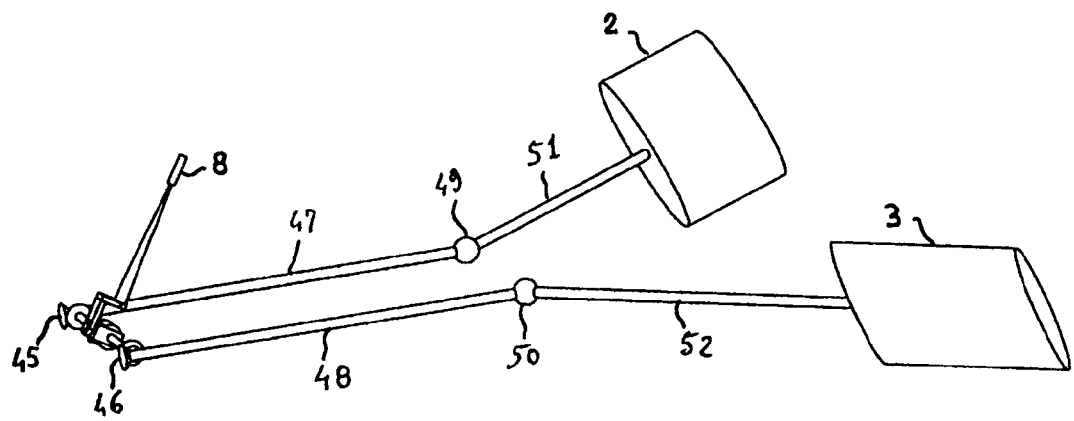
Figure 9:
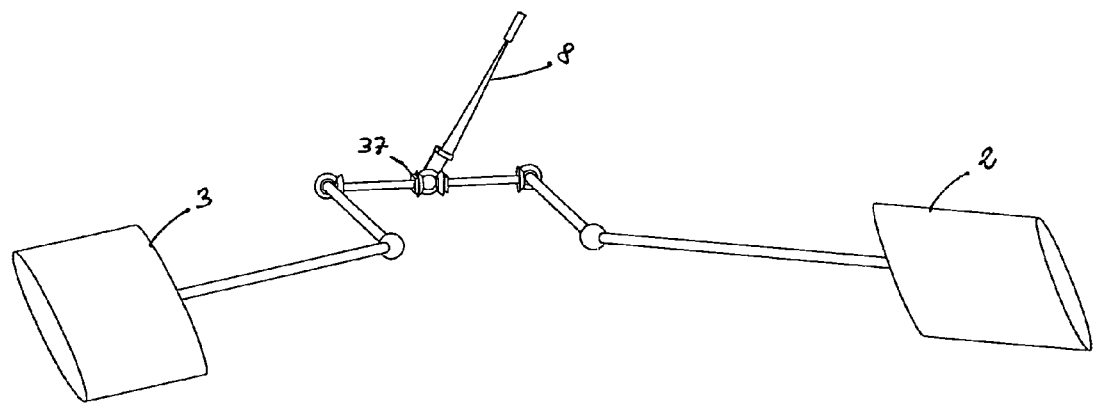
Figure 10:
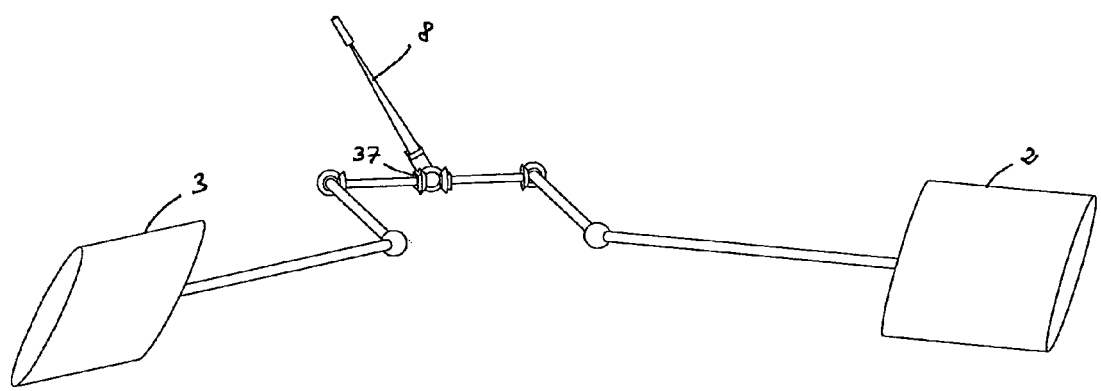

FIG. 8, which is similar to FIG. 7, shows the relation existing between the movement backwards of the lever (as exerted by the pilot) and the corresponding position assumed by the two rear ailerons;

FIG. 9 shows the relation existing between the movement to the right of the lever (as exerted by the pilot) and the corresponding position assumed by the two rear ailerons;

FIG. 10 shows the relation existing between the movement to the left of the lever (as exerted by the pilot) and the corresponding position assumed by the two rear ailerons;

FIG. 11 shows, instead, the mechanism of operation of the pedals or rudder bar, which is located in the conventional position, down in front of the pilot, who controls the pedals with his feet to govern the position of the front aileron.

According to a peculiar characteristic of the invention, it is envisaged that the counter-rotating coaxial rotors are not subjected to cyclic variations of the pitch: hence, it is advantageously possible to stiffen the structure of the blades up to the maximum allowed by the technological and constructional processes adopted for their production, and moreover it is advantageously possible to equip said blades with additional end masses, which, in addition to keeping them further stiffened by centrifugal force during rotation, enable the rotors to accumulate also a greater amount of kinetic energy, which becomes very useful in possible critical conditions of flight, and in particular in manoeuvres of autorotation.

Figure 1:
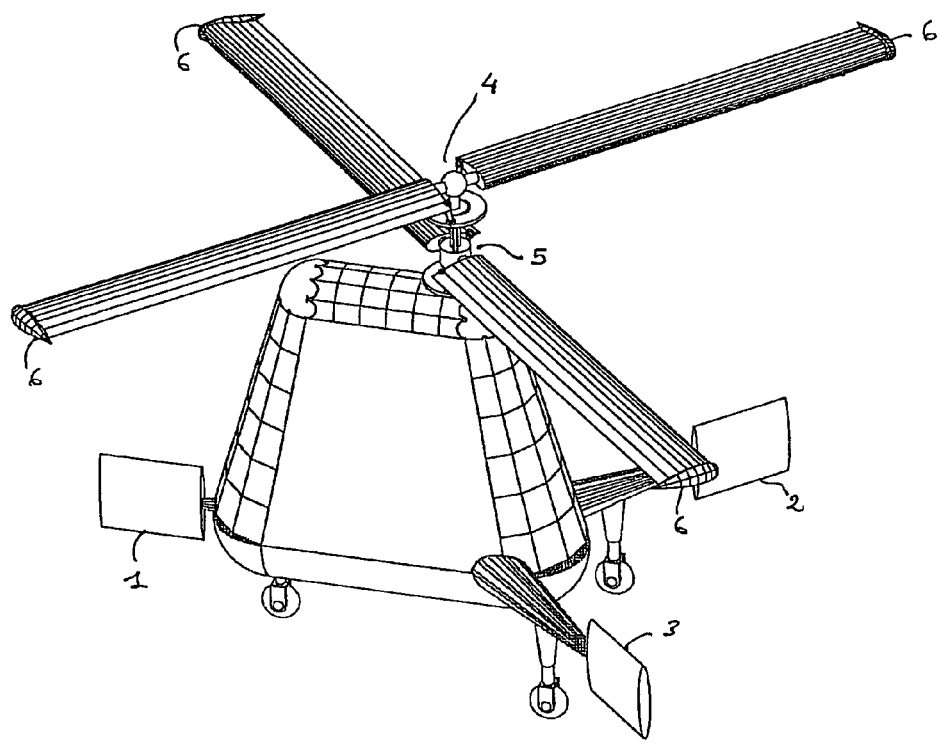
FIG. 1 shows an overall external view of a possible embodiment of the helicopter according to the present invention.

As regards the aforementioned governing surfaces, or ailerons, according to the present invention, they are preferably at least three in number (FIG. 1). In particular, two ailerons 2 and 3 are arranged in the rear part of the fuselage, symmetrically with respect to the longitudinal axis of the machine, with the respective axes of rotation lying in a horizontal plane passing through the center of gravity of the aircraft. Their movement is governed by the pilot through the traditional control lever 8, which, according to the present invention, only performs this function.

The third aileron 1 is instead positioned at the prow, precisely on the longitudinal axis of the helicopter, and also this has its own axis of rotation lying in the horizontal plane passing through the center of gravity of the machine and can be actuated by the pilot by means of the pedals 10-11, which according to the present invention perform this single and specific function.

Figure 2:
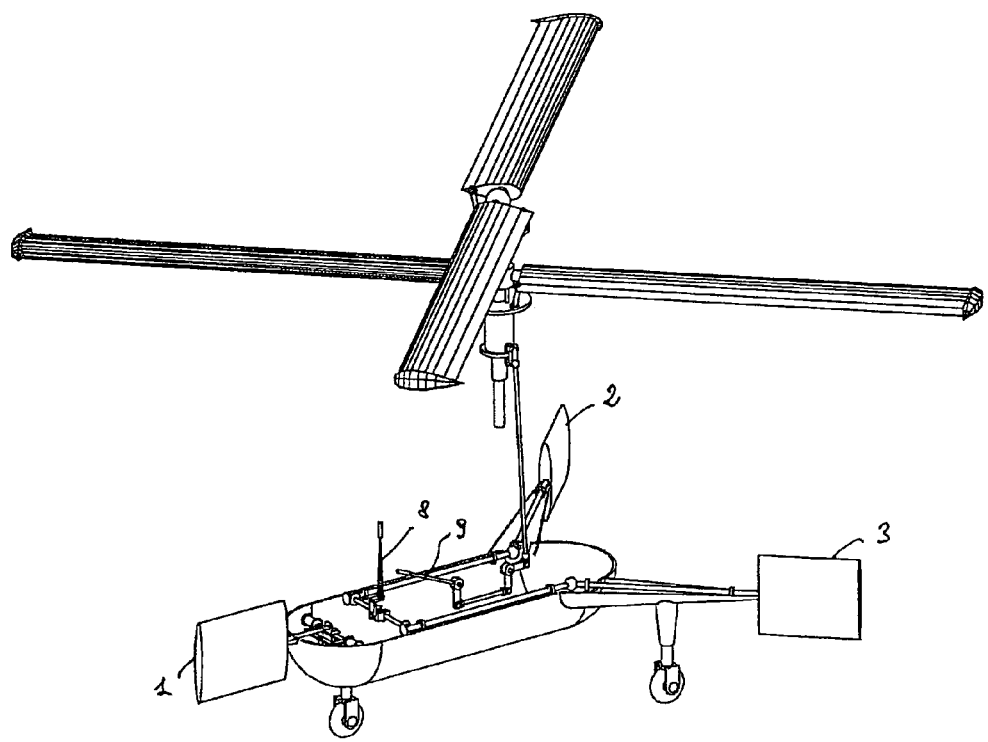
FIG. 2 shows the mutual positioning and a possible location within the fuselage of the three control members with the innovative kinematic actuation chains.
Figure 3:
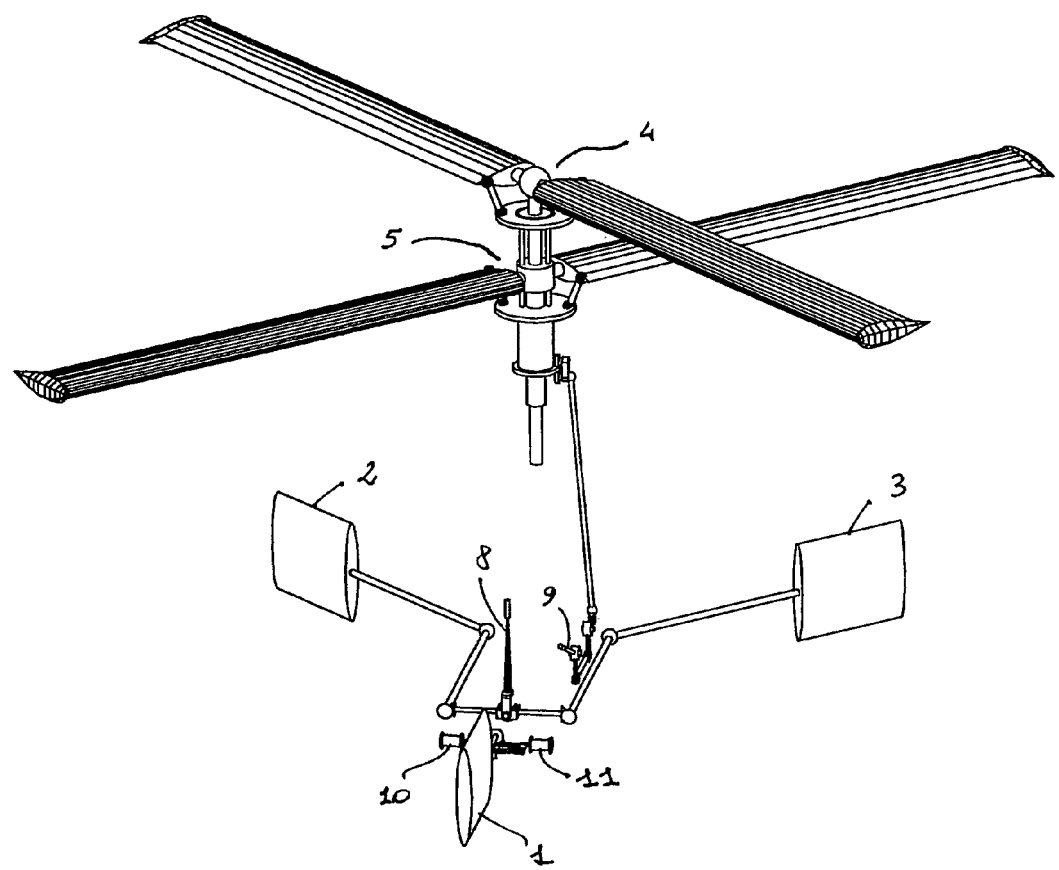
FIG. 3 shows in greater detail the structure corresponding to said control members.

It remains moreover the task of the pilot to actuate the collective-pitch control lever 9, which may be seen in FIGS. 2 and 3 together with a panoramic view of all the kinematic chains for governing the attitude, with which the machine is equipped. Said collective-pitch control lever, as regards what is envisaged in the present invention, performs only and exclusively the function of simultaneous and equivalent variation of the incidence of the blades of both rotors.

As will emerge clearly from what follows, this function is substantially identical to the one performed also in all the other state-of-the-art helicopters but in the present invention occurs advantageously in a very simplified way.

All the other members of the helicopter, such as, for example, the engine, the transmission and decoupling chain present between the engine and the shafts for controlling the rotors, as well as the gear train that usually reverses the direction of rotation of the coaxial shafts, are of a substantially known type, with the characteristics proper of helicopters with two counter-rotating coaxial rotors known in the art.

According to the invention, the three commands referred to, i.e., the two levers 8-9 and the pedals 10-11, albeit substantially homologous to the ones present on present-day helicopters and already familiar to any pilot, govern members different from the traditional ones.

In the detailed explanation of the structure and of operation of each of the new governing members provided according to the present invention, there will also be explained the aerodynamic effect produced thereby.

Shown in FIG. 1 are the fundamental and peculiar specific elements of the invention, which are, in the first place, the three ailerons arranged at the base of the machine in a horizontal plane, parallel to the fixed plane of rotation of the rotors and passing through the center of gravity of the machine. In conditions of fixed-point stationary flight the wing chord of said ailerons is kept parallel to the axis of rotation of the rotors, or, in other words, orthogonal to their plane of rotation. The aileron located at the prow will be referred to in what follows as "front aileron" 1. The two ailerons arranged in a symmetrical way astern will be referred to in what follows respectively as: right-hand aileron 2 and left-hand aileron 3. Identified in the same FIG. 1 are a top rotor 4 and a bottom rotor 5, fitted on two different counter-rotating coaxial shafts. Likewise illustrated in FIG. 1 at the end of each blade of the rotors is a heavy aerodynamic body 6, which has the function of stiffening further the respective blade by centrifugal force during rotation, in addition to increasing significantly the moment of inertia of the entire rotor system, enabling it to accumulate a considerable amount of kinetic energy, especially during rotation in the presence of thrust on the part of the engine or engines.

It is should also be noted that, in the technical solution that is described, the use of said heavy end bodies 6, albeit already known in the helicopter field, proves particularly advantageous and easy to produce precisely thanks to the fact that the blades are not subject to the continuous variation of incidence produced by the cyclic-pitch control, which is altogether inexistent according to the present invention. In fact, the unit for controlling the rotor system according to the present invention, which is schematically illustrated in FIG. 3, comprises two rotating but non-oscillating plates, the function of which will be explained in detail in what follows. Said unit starts from the collective-pitch control lever 9 and reaches the rotor control head. Illustrated in the same FIG. 3 is the kinematic chain of the main control lever 8, which starts from the latter and is able to govern in a co-ordinated way inclination of the two rear ailerons, the right-hand one 2 and the left-hand one 3.

Once again shown in FIG. 3 are the commands of the pedals, set in front of the pilot facing the prow of the machine. Via the right-hand pedal 10 and left-hand pedal 11, inclination of the front aileron 1 is modified.

Figure 4:
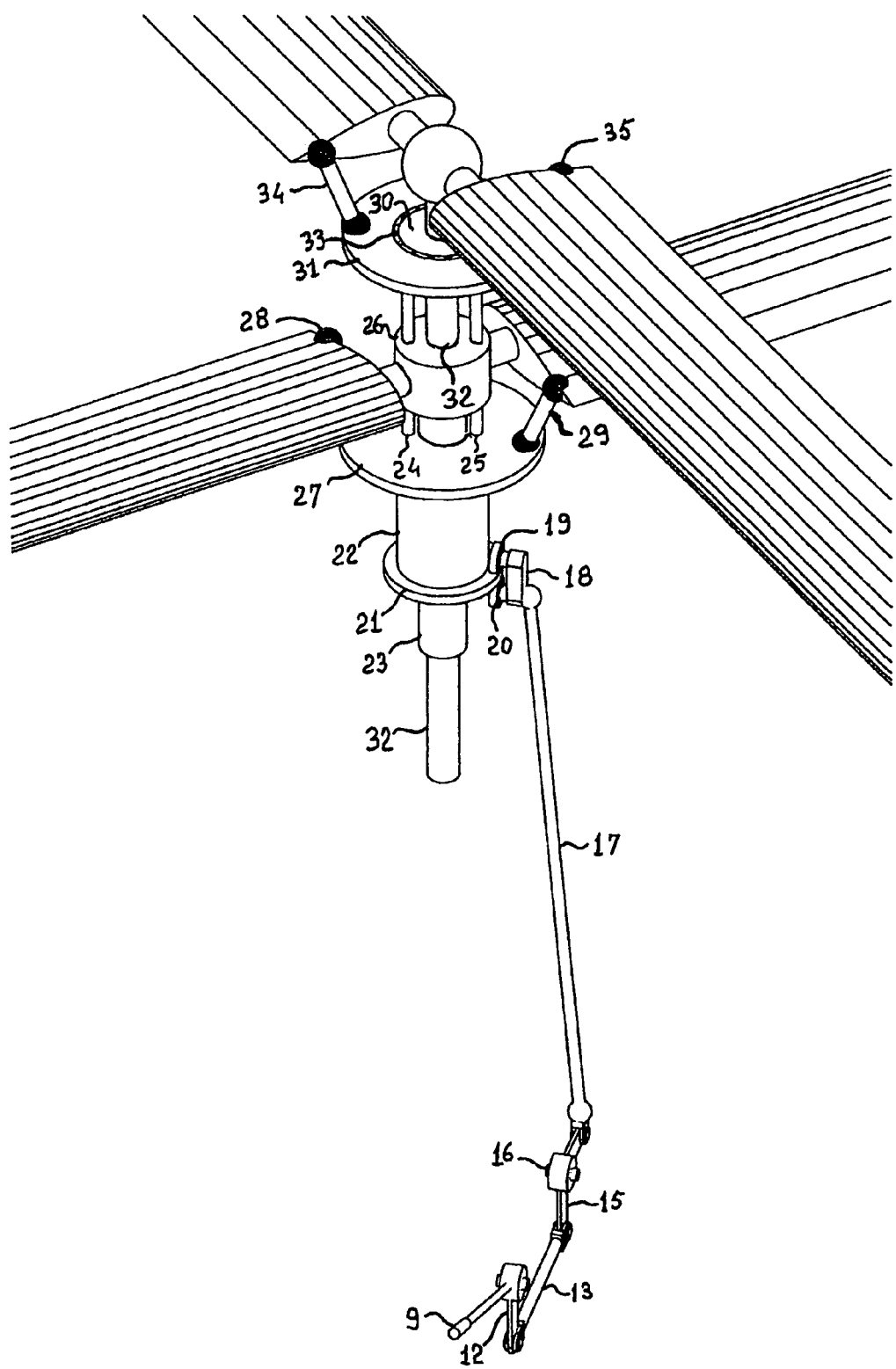
FIG. 4 shows specifically the kinematic chain that starts from the collective-pitch control lever, set in the conventional position to the left of the pilot, who moves it with his left hand, and terminates on the simplified rotor head that governs incidence of all the blades.

FIG. 4 enables a detailed analysis of the collective-pitch-control kinematic chain, which can be direct, as represented in the figure, or else envisage interposition of a servo of a known type, possibly necessary for reducing the effort made by the pilot. It originates from the collective-pitch control lever 9, set usually to the left of the pilot, who can move it upwards or downwards. In FIG. 4 it is represented in a neutral position, i.e., the one that causes all the blades to assume simultaneously a zero geometrical incidence with respect to the plane of rotation of each rotor so that no sustaining force is generated when the machine is resting on the ground.

From an analysis of the behaviour of said collective-pitch-control kinematic chain, it may be readily noted how, via the arm 12 fixed with respect to the lever 9, it is possible to move the tie rod 13 that causes rotation of the right-angled transmission lever (or L-lever) 15, pivoted on the pin 16, which governs the articulated tie rod 17. The latter, on account of the axial movement upwards or downwards that can be imposed on it by the collective-pitch control lever 9, governs the displacement upwards or downwards of the control head 18 that is equipped with two bearings 19 and 20 that roll on the bottom flange 21 fixed with respect to the cylindrical body 22. Said cylindrical body or "sleeve" 22 is free to slide axially on the outer coaxial shaft 23 but turns fixedly with respect thereto, because it is drawn along by the longitudinal rods 24 and 25, which are fixed with respect to the sleeve 22 itself.

Said longitudinal rods 24-25 traverse freely the head 26 of the bottom rotor, which is rigidly fixed to said shaft 23, sliding freely in an axial direction within said head 26 and being drawn along thereby in rotation.

The disk 27 is also rigidly fitted on the sleeve 22, and consequently there follows both rotation, governed by the shaft 23 by means of the rods 24 and 25 via the head 26, and axial translation thereof, governed by the control head 18, this too being transferred onto the sleeve 22. Anchored in an articulated way on the disk 27 are the articulated tie rods 28 and 29, which come to move the trailing edge of the respective blades of the bottom rotor connected thereto and which turn in perfect synchronism with the plate 27 in so far as they are set in rotation, albeit indirectly, by the outer shaft 23 itself.

According to the present invention, the blades of the bottom rotor are fitted to the shafts that join it to the head 26 with just one degree of freedom, namely, the one that enables variation of the collective pitch thereof. In fact, the function of the tie rods 28 and 29 is precisely that of applying to the trailing edge of the respective blade the translational movement of the disk 27, in this way producing the variation of the incidence of each of the blades of the rotor itself.

According to a peculiar characteristic of the invention, the aforesaid rods 24 and 25 transmit the same translational movement of variation of the pitch integrally also to the top rotor, which shares the same axis as, and is counter-rotating with respect to, the previous one.

In particular, in the preferred embodiment described herein, said rods 24-25 transmit their axial translation to the inner disk 30 of the outer ring 31, which turns in a direction opposite to the disk 30 on account of the action of decoupling effected by the thrust bearing 33. Within said disk 30 the inner shaft 32 turns freely and in an opposite direction, without any mechanical interference. Consequently, the translational movement of the plate 31 remains always identical to that of the bottom flange 21 and of all the elements already described, which are fixed with respect thereto as well as with respect to one another.

Anchored to the rotary plate 31 are the articulated tie rods 34 and 35 for the top rotor, which are consequently moved in perfect synchronism with the tie rods 28 and 29, actuated by the disk 27, bringing about an identical displacement on the trailing edge of the blades of the top rotor, which is counter-rotating and shares the same axis as the bottom rotor. There is obtained in this way a perfectly synchronous variation of the pitch of all the blades, i.e., of the collective pitch of both rotors.

It should be emphasized that, according to a further peculiar characteristic of the present invention, neither the disk 27 nor the rotary plate 31 are oscillating; consequently, no blade is ever subjected to cyclic variations of incidence. By following the kinematic chain described so far with regard to the collective-pitch control lever 9, it emerges clearly how by moving said lever 9 upwards the displacement downwards of the trailing edge of all the blades is generated simultaneously, producing an increase in their incidence, both geometrical in an absolute direction and aerodynamic according to the instantaneous conditions of flight. The reverse operation is obtained by lowering the lever 9 itself, with collective reduction of the incidence of all the blades. These operations thus enable control of ascent and descent of the helicopter.

Unlike present-day aircraft, in which the lateral attitude in any direction is governed via the cyclic-pitch control, in the present invention management of the lateral attitude is instead entrusted to the two rear ailerons 2-3, the instantaneous position of which is determined by the pilot by moving of the control lever 8 through a specific kinematic control chain either directly (FIG. 5) or with interposition of servos of a known type, which may be necessary for reducing the effort made by the pilot. The control exerted on the lever 8 reaches the ailerons 2 and 3 through a specular sequence of kinematic connections deriving from a control block, formed substantially between three bevel gears constantly meshed together, which in what follows will also be designated as "differential block or structure", which are actuated by said lever 8 and are represented as a whole in FIG. 5. FIG. 6 represents in particular said differential block and serves as reference for the ensuing description of operation thereof. The differential block is formed by said lever 8, fixed with respect to which are the vertical L-shaped bracket 36 and, via a short shaft that freely traverses the horizontal C-shaped bracket 37, the central bevel gear 38, which is consequently able to follow any movement exerted on the lever 8. Said central bevel gear 38 always meshes with two further lateral bevel gears, a right-hand one 39 and a left-hand one 40, which are to constitute therewith a classic differential structure. Said lateral bevel gears 39 and 40 are fixed with respect to one end of the respective right-hand half-shaft 41 and left-hand half-shaft 42, and their meshing with the central bevel gear 38 is ensured by a purposely provided support or C-shaped bracket 37. The two half-shafts 41 and 42 are free to turn in the respective holes on the support 37 and are in turn rigidly connected to outer end bevel gears 43 and 44. The latter in turn move the transmission bevel gears 45 and 46, which govern the longitudinal rods 47 and 48, respectively.

Figure 5:
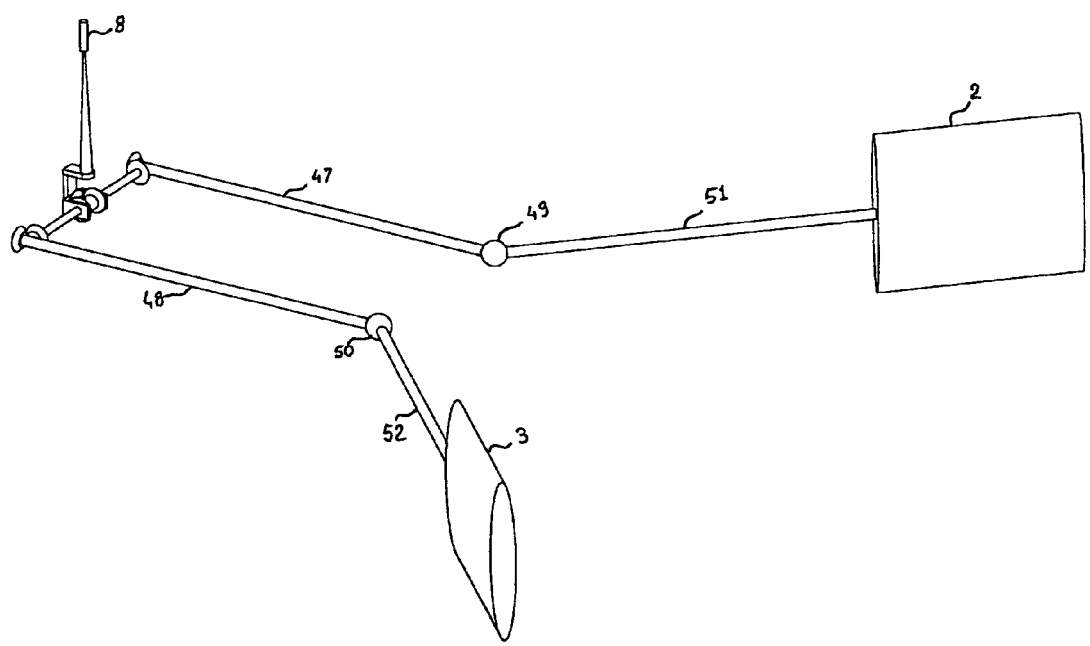
FIG. 5 shows specifically the control chain governed by the piloting lever or joystick, which is set in the conventional position in front of the pilot who normally moves with his right hand.
Figure 6:
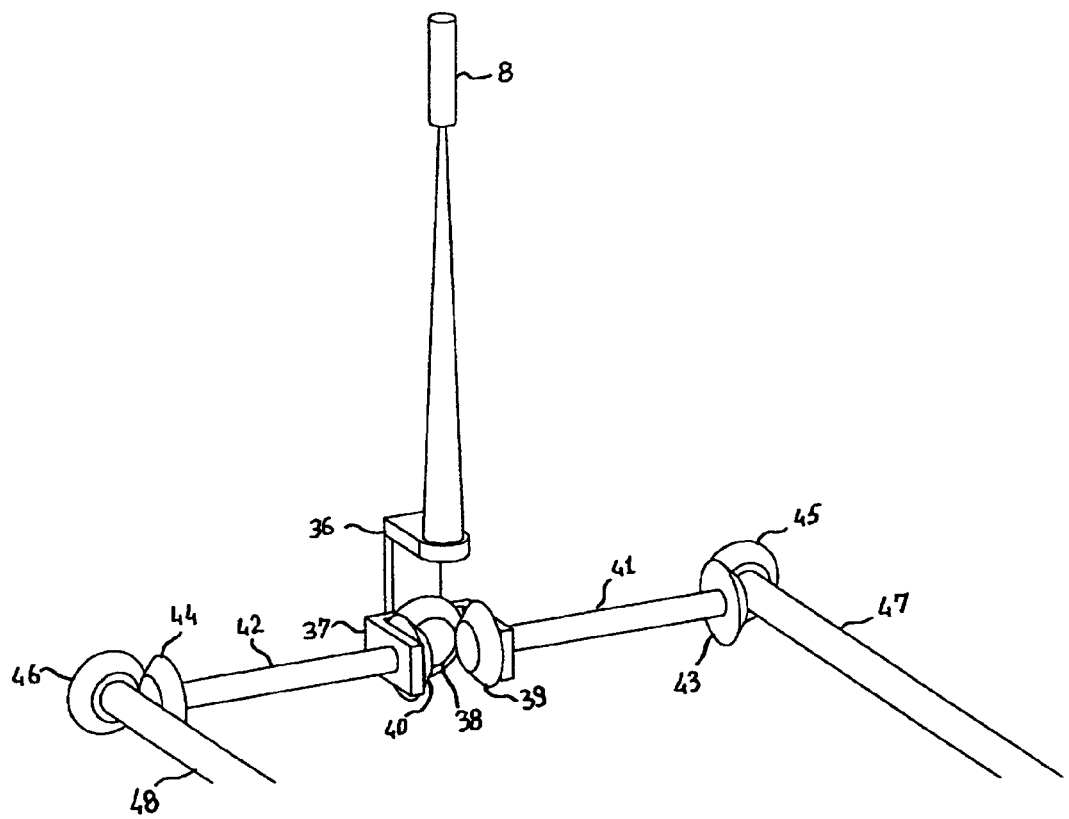
FIG. 6 is an enlarged view of some of the main mechanical members located in the proximity of the piloting lever or joystick, which collect and convert the movements thereof to send them correctly to the two rear ailerons.

The longitudinal rods 47 and 48, as may be seen from FIG. 5, through the constant-velocity universal joints 49 and 50 and the further transmission rods 51 and 52, transfer the movements generated by the main lever 8 from the differential block to the right-hand aileron 2 and left-hand aileron 3, respectively.

With particular reference to FIG. 6, it is possible to understand in detail in what way the position of the main control lever 8 determines that of the rear ailerons 2 and 3. For reasons of simplicity of explanation, we shall start from the two main movements that the pilot can impose on the lever, which we shall take as reference and which are: the displacement forwards-backwards (longitudinal) and to the right and to the left (transverse), to which there must correspond similar displacements of the entire helicopter. Any other possible movement of the lever 8 will be no other than a vector sum of the components of the displacement along these two main reference axes.

If a displacement forwards or backwards of the lever is considered, it may immediately be noted (FIG. 6) how, through the fixed assembly formed by the main lever components 8, the L-shaped bracket 36, and the central bevel gear 38, rotation is produced, forwards or backwards, of the C-shaped bracket 37, without the gear 38 making any rotary movement with respect to the C-shaped bracket 37. In said condition, also the lateral bevel gears 39 and 40, meshed to the central bevel gear 38, will rotate together with the bracket 37, which draws them in the same direction and by the same angle, without there occurring any relative movement between them. This derives from the fact that the gear 38 does not have relative motion with respect to the bracket 37. For the same reasons, the two half-shafts 41 and 42, which are fixed with respect to the lateral bevel gears 39-40, will rotate forwards or backwards by the same angle imposed by the pilot upon the main lever 8 as if they were a single fixed shaft. Bearing in mind this fact, it may be noted, instead, how the bevel gears 45 and 46, meshed, respectively, to the gear 43 and to the gear 44 fitted at the opposite ends of the respective half-shafts, will come to turn in the opposite direction with respect to one another.

The final effect of said rotation in an opposite direction, otherwise referred to as "conjugate", which is transmitted without variations onto the two rear ailerons 2-3, may be noted from FIGS. 7 and 8. Represented in FIG. 7 is the position assumed by the rear governing ailerons when the pilot pushes the lever all the way forwards. In this control attitude, the gear 45, viewed from the position of the pilot, turns in a counterclockwise direction by the same angle with which the lever turns, whilst the gear 46 also turns by the same amount, but in a clockwise direction. These rotations are transferred without variations, through the transmission rods 47, 51, and 48, 52 and the constant-velocity universal joints 49 and 50 directly onto the rear ailerons 2-3, and cause the respective top leading edges to approach one another and the bottom leading edges to move away from one another; i.e., the two ailerons are divaricated with respect to the side of the fuselage.

Considering that they are impinged upon by the descending vertical rotor flow, each will produce thereon a deviation that is specularly symmetrical to the one produced by the other. Given the angled position of the axis of rotation of the ailerons with respect to the longitudinal axis of the machine, the aileron 2 will deviate the rotor flow forwards and to the right, whereas the left-hand aileron will deviate it specularly with respect to the longitudinal axis of the fuselage forwards and to the left. In these conditions, the right-hand and left-hand components will cancel one another out, whilst forward components will add up.

According to the present invention, by the known principle of action and reaction, their resultant will impose on the center of gravity of the aircraft a force tending to displace it backwards, and the entire aircraft, being sustained by the force of the two rotors located above its center of gravity, will react by being inclined forwards. This new attitude will produce a corresponding inclination of the axis of rotation of the rotors and hence of their (mutually parallel) planes of rotation, which, on account of the way in which the machine so far described is structured and built, are kept always orthogonal to the axis of rotation of the rotors.

There derives the formation of a component of thrust of the rotor flow oriented towards the prow of the aircraft, which produces displacement of the machine forwards, namely, in the direction of the manoeuvre of displacement forwards effected by the pilot on the main lever 8 and examined at the start of this analysis.

The displacement of the lever all the way backwards, according to a mechanism opposite to what has so far been represented and explained, produces, by symmetry, an equivalent rotation of the rear ailerons 2 and 3 in the opposite direction as illustrated in FIG. 8, where it may be noted that they turn in such a way that the respective top leading edges move away from one another, whilst the bottom trailing edges approach one another. In these conditions, the descending rotor flow is deviated inwards and backwards with respect to the center of gravity of the machine. By reaction, the center of gravity of the machine will undergo a thrust forwards towards the prow, which will produce inclination backwards of the aircraft itself and of the planes of rotation of the blades, i.e., precisely in the direction governed by the pilot with the main lever 8.

To understand, instead, what happens when the main lever 8 is displaced to the right or to the left, it is necessary to refer again to FIG. 6.

When the lever 8 is turned to the right or to the left, the horizontal C-shaped bracket 37 remains stationary, whilst the L-shaped bracket 36 turns fixedly with respect to the lever itself: consequently, also the bevel gear 38, connected fixedly thereto, moves by the same angle. Said gear 38 transfers its own rotary motion to each of the lateral bevel gears 39 and 40, which evidently will rotate in a direction opposite to one another, drawing along with them the respective half-shafts 41 and 42 and hence the outer gears 43 and 44. In this case, the latter will impose on the gears 45 and 46, with which they are meshed, a rotation in the same direction: in the case in point, the gears 45 and 46 will both turn in a counterclockwise direction when the lever 8 is displaced to the right and in a clockwise direction when the lever 8 is displaced to the left. Said rotation will evidently be followed also by the shafts 47 and 48, fixed with respect to the gears 45 and 46, as well as by the rear ailerons 2 and 3 via the remaining part of the transmission chain.

According to the present invention, the rear ailerons 2 and 3, which in the case of displacement of the lever 8 forwards/backwards moved with conjugate motion, in the case where the main lever 8 is displaced to the right or left, will move with concordant motion but in the opposite direction to the one in which the lever itself is moved.

The result that is obtained in the two end positions to the right and to the left of the main lever 8 is represented in FIGS. 9 and 10.

In the two cases, of lever moved to the right and lever moved to the left respectively, it may be noted how the C-shaped bracket 37 remains stationary. In FIG. 9, we can see how, with the lever all the way to the right, considering the movement as viewed by the pilot, the top leading edges of the ailerons both turn towards the left-hand side of the machine. In this case, the dominant component of the deviated rotor flow is oriented towards the right-hand side of the aircraft, displacing the center of gravity and turning it to the left and inclining the aircraft to the right, i.e., to the side desired.

If we consider FIG. 9, it may immediately be noted that the right-hand aileron 2 deviates the rotor flow to the right and forwards, whilst the left-hand aileron 3 deviates the rotor flow to the right and backwards. Consequently, in addition to the resultant force to the right, which by reaction generates a thrust on the helicopter and a rotation on account of the distance of said thrust from the center of gravity, there is also a pair of forces that generates a torque on the center of to gravity, which tends to turn the helicopter to the right.

The reverse condition, the explanation of which should be by now obvious, is represented in FIG. 10, where the lever is inclined all the way to the left, the ailerons are both inclined towards the right-hand side of the machine, pushing the center of gravity and causing it to turn to the right and inclining the entire machine to the left, i.e., once again in the direction governed by the pilot.

It should be noted that; since the rear ailerons are set back with respect to the center of gravity, as clearly emerges from FIG. 1, whereas in response to the forward-backward commands the machine will move effectively either forwards or backwards, at the moment when a lateral command is imparted, or a lateral component is introduced, given the position of the fins, also a component of rotation on the axis of yaw is induced on the machine, which in itself favours turning. Said rotation will be all the more accentuated, the greater the lateral displacement induced on the lever, tending to increase the rate of the turn. In the case where, albeit wishing to incline the machine rapidly on one of the two sides, the pilot were to wish to prevent a simultaneous excessive rotation on the axis of yaw, he can compensate for said spontaneous attitude, by reducing as desired the rate of the turn by means of the pedals, turning the front aileron appropriately therewith, and thus obtaining the desired path precisely. If, instead, the pilot acts only on the pedals, keeping the lever in a neutral position and centred, he will obtain simple rotation of the machine with respect to its axis of yaw, in a way similar to what occurs currently in helicopters equipped with a system for controlling the attitude on the axis of yaw (those with the tail rotor set vertically), i.e., different from what has just been described.

The mechanism for controlling the pedals, which governs the position (rotation) of just the front aileron, is illustrated in FIG. 11. As may be seen, the pedal set is formed by the two pedals, a right-hand one 10 and a left-hand one 11, available to the pilot, who can move them with his feet. Said pedals, with the corresponding L-shaped brackets 49 and 50 form part, together with the transverse arms 51 and 52, of a pantograph parallelpiped. The bevel gear 53, which is fixed with respect to the arm 52, moves the bevel gear 54 and thereby the shaft 55 and the front aileron 1 that is rigidly connected thereto. Said control chain can be simple and direct, as represented in the figure, or envisage insertion of a possible servo of a known type to reduce the effort made by the pilot. The pantograph arrangement of the mobile rods enables the pedals to effect a parallel to-and-from movement, albeit inducing a rotation on the gear 53 and the other elements of said control chain.

From an analysis of the kinematics of the device, it may be seen how, by pushing the right-hand pedal 10 forwards, the gear 53, viewed from above, turns in a counterclockwise direction, and the gear 54 drawn along thereby, viewed from the front, turns in a clockwise direction, producing, through the shaft 55, inclination to the right of the top leading edge of the front aileron 1, or, if so preferred, its rotation in a clockwise direction if viewed from the position of the pilot. When the front aileron 1 is in said position, inclined with respect to the structure of the aircraft, it is evident that it deviates the rotor flow to the left-hand side of the helicopter. In these conditions, if the lever is kept at the centre, the machine will turn on the axis of yaw to the right, i.e., on the side of the pedal that is pressed.

A similar but opposite behaviour will be obtained by pressing the left-hand pedal.

The above analysis has been made on the hypothesis that only the pedal is operated.

In the reverse case, if operation of the pedals 10-11 is simultaneous to that of the main lever 8, a modification is obtained in the effectiveness of the control according to the choices made by the pilot, rendering the behaviour of any possible type of manoeuvre voluntary and determinate, especially when making a turn.

Having exhausted the structural description of the elements for governing the attitude of the aircraft provided according to the present invention in the ordinary operation thereof, as well as the effect of the manoeuvres performed on the control members, it remains for us to describe its behaviour in the specific condition of flight commonly referred to as autorotation and which presents as an inescapable condition in the event of the partial or total lack of the tractive force exerted by the engine. Also in this case, the characteristics of behaviour of the machine according to the invention go beyond and substantially improve the possibilities of other currently existing machines of the same class. This is obtained owing to two specific fundamental elements: in the first place, on account of the possibility of causing all the blades to assume simultaneously a marked negative incidence; in the second place, on account of the presence of the aforementioned masses 6 for a localized increase of weight at the end of each blade.

It should in fact be noted that, in present-day helicopters and in currently known aircraft of this sort, it is altogether impossible to cause the blades for sustaining the rotors of the aircraft to assume a marked negative incidence. This impossibility is due to the impediment represented by the presence of the cyclic-pitch control. In present-day helicopters, the condition of stalling in autorotation, if it occurs, proves almost always degenerative and non-recoverable, whatever the height and attitude of flight, bringing about fall of the aircraft. There exists for any machine currently in circulation a specific diagram that imposes on the pilot the obligation to prevent, or reduce to a minimum, given flight situations, precisely to prevent the onset of these serious, frequently fatal, problems of stalling. Said diagram is tragically known to any helicopter pilot, in so far as in aeronautic jargon it is defined as "dead man's curve".

With the present invention and with a minimum of attention paid on the part of the pilot, the real possibility that such serious problems may occur is practically zero, whatever the height and attitude maintained by the aircraft. In fact, the greater kinetic energy stored by the rotors, thanks to the end weights 6 on the blades, prevents, even in the absence of the engine, the speed of rotation thereof from possibly degrading in a very short time such as in any case to prevent effective and timely corrective interventions on the part of the pilot, leaving him the time and the possibility to govern safely the descent of the machine even at very low altitudes. Identically, at high altitudes, the capacity for preventing loss of engine r.p.m. remains unvaried, whilst the pilot is afforded the new and resolutive opportunity to cause all the blades to assume rapidly a marked negative incidence, even greater than $-45°$.

In this way, even though the machine is losing height and finds itself with the blades in conditions of serious aerodynamic stalling, they can be brought back into a condition of laminar flow, with restoration of the aerodynamic lift with respect to the relative fall wind, and consequent restoration of the speed of rotation, enabling the pilot to re-acquire subsequently and progressively the prescribed speed of rotation, with the incidence brought back to values normal for descent in conditions of autorotation.

The emergency manoeuvres described here are possible only with an aircraft according to the present invention precisely thanks to the fact that it is without control of the cyclic pitch, the presence of which would render said manoeuvres impossible.

However, there exists also another condition of flight in which the machine described herein overcomes the limitations of other currently known machines, and it is the one in which it can in effect be compared to a convertiplane, without possessing, however, the extremely high constructional complexity of the latter or the serious risks in the event of even minimal breakdowns. In the case in fact where the machine described according to the present invention is equipped with an engine or engines of adequate power, it will be possible to bring it to a quasi-horizontal attitude of flight at a speed higher than the one that can be reached by any present-day helicopter, simply by controlling the incidence of the rear ailerons 2 and 3. In said particular attitude, the rotors, the plane of rotation of which will be almost vertical, will assume the function of traditional counter-rotating propellers with variable pitch, and the rear ailerons, in addition to continuing to perform their primary function of controlling the attitude, will start to develop aerodynamic lift like the wings of an aeroplane. The machine may then re-assume at any moment the traditional attitude of the helicopter by simple reduction of the power applied to the rotors and by controlling the incidence of the rear ailerons 2 and 3. It will be desirable, in aircraft prearranged for this further possibility of flight, to have available simple mechanisms designed to control the position of the seats for the pilot and the possible passengers, to compensate for the marked rotation of the fuselage and keep the occupants of the aircraft in a position close to the vertical.

Advantageously, said devices are not required in machines of the type that has now been described without pilot and/or crew on board.

In conclusion and to sum up the concepts contained herein, it may be said that the present invention, as regards the stress that is exerted even in conditions of normal flight on the structures and on the aerodynamic governing controls, finally brings the behaviour of the helicopter, which is normally far more critical and unstable, closer to that of the aeroplane, even though the helicopter maintains the specific possibility of flight and command at very low speeds or even at a fixed point, which are totally precluded for the aeroplane. Furthermore, it can assume also the characteristics proper to the aeroplane in the presence of sufficient motive power installed.

In the preferred embodiment described herein, it is envisaged that the lever 9 for control of the collective pitch of the blades is able to produce a simultaneous and collective variation of the incidence of all the blades, which, for positive incidence of the leading angles reaches values higher than or equal to 12°, whilst for negative incidence of the leading angles it reaches values higher than 45°.

Advantageously, according to the invention this is obtained simply by means of control of the translation of just two coaxial and counter-rotating, though non-oscillating, plates forming part of a rotating element positioned in the proximity of the rotors and made to slide on the respective shafts by means of transmissions coming, directly or by interposition of servos, from the previously described collective-pitch control lever 9 and acting in perfect synchronism each on the blades of a rotor in order to vary the incidence of the blades thereof.

The invention claimed is:

1. An aircraft with counter-rotating sustaining rotors (4, 5), comprising: a rotor control head, said rotors operatively connected to the rotor control head;
   a collective pitch variation control (9) operatively connected to said rotors (4, 5), said collective pitch variation control, via the rotor control head, simultaneously applying an equivalent variation to an incidence of all blades of said rotors (4, 5) varying the collective pitch of said rotors, said rotors (4, 5) being counter-rotating sustaining coaxial rotors; and
   an attitude and direction flight control generating aerodynamic forces via sustaining rotor wind from said blades of said rotors (4, 5), the aircraft being free of elements for variation of cyclic pitch of the blades of the rotors,
   the attitude and direction flight control comprising governing surfaces including two governing surfaces (2, 3) placed in a back part of the aircraft, and a control element (8) operatively connected to said two governing surfaces functioning to move said two governing surfaces with respect to each other in order to produce a pitching movement of the whole aircraft,
   the rotor has a fixed substantially vertical axis,
   said governing surfaces are substantially constituted by three governing surfaces defined by three ailerons (1, 2, 3), and
   each of the three ailerons move independently to control the yaw.

2. The aircraft according to claim 1,
   wherein said counter-rotating rotors comprise a top rotor (4) and a bottom rotor (5), said top and bottom rotors (4, 5) sharing a common axis, and
   said collective pitch variation control (9) comprises a collective-pitch control lever (9) operatively connected to said top and bottom rotors (4, 5) and only and exclusively controlling the simultaneous and equivalent variation of the incidence of the blades of both of the sustaining rotors.

3. The aircraft according to claim 2, wherein said collective pitch variation control (9) comprises two rotating, but non-oscillating, disks (27, 31), arranged to vary inclination of the blades of the rotors (4, 5), said rotating, but non-oscillating, disks (27, 31) being located in the rotor control head.

4. The aircraft according to claim 3, further comprising:
   a collective-pitch control kinematic chain originates from the collective-pitch control lever (9) and is movable upwards or downwards by the collective-pitch control lever (9),
   said collective-pitch control lever (9) being fixed with respect to an arm (12), arranged to move a tie rod (13), which causes rotation of a lever (15), pivoted on a pin (16) governing an articulated tie rod (17), arranged to move axially upwards and downwards to govern displacement upwards and downwards of a control head (18), wherein,
   the control head (18) is equipped with two bearings (19, 20) that roll on a bottom flange (21) fixed with respect to a sleeve (22), and
   said sleeve (22) being free to slide axially on an outer coaxial shaft (23) turning fixedly with respect thereto, and drawn along by longitudinal rods (24, 25) fixed with the respect to the sleeve (22).

5. The aircraft according to claim 4, wherein,
   said longitudinal rods (24, 25) traverse freely a head (26) of the bottom rotor (5) fixed rigidly to said outer shaft (23),
   said longitudinal rods (24, 25) sliding freely in an axial direction within said head (26) and being drawn along thereby in rotation,
   said head (26) of the bottom rotor (5) comprises a first of said two non-oscillating disks (27) fitted rigidly on the sleeve (22) so as to follow both
   i) rotation of the sleeve (22), governed by the outer coaxial shaft (23) by means of the rods (24, 25) via the head (26) of the bottom rotor (5), and
   ii) axial translation of the sleeve (22), governed by the control head (18),
   articulated tie rods (28, 29) anchored, in an articulated way, on the first non-oscillating disk (27) and to a trailing edge of the bottom rotor (5), the articulated tie rods (28, 29) arranged to move the trailing edge of the respective blades of the bottom rotor (5) to turn the respective blades of the bottom rotor in perfect synchronism with the first non-oscillating disk (27) under control of said outer coaxial shaft (23),
   the blades of the bottom rotor (5) are fitted to shafts that join the blades of the bottom rotor to the head (26) with exactly one degree of freedom that enables variation of the collective pitch thereof, and
   the articulated tie rods (28, 29) apply translational movement of the disk (27) to provide a displacement to the trailing edge of the respective blade of the bottom rotor (5) and thereby producing a corresponding variation of the incidence of each of the blades of the bottom rotor (5).

6. The aircraft according to claim 5, wherein,
   said longitudinal rods (24, 25) undergo axial movement, and said axial movement of said longitudinal rods (24, 25) is transmitted to change a pitch of the top rotor (4),
   an inner disk (30) is associated with a second of said rotating, but non-oscillating, disks (31), said second non-oscillating disk (31) being an outer disk (31), both said inner disk (30) and said outer ring (31) being non-oscillating, a thrust bearing (33) is located between the inner disk (30) and the outer disked (31), said longitudinal rods (24, 25) transmit their axial translation to the inner disk (30) and the outer disk (31), in response to the transmission of the axial translation of the longitudinal roads (24, 25) to the inner disk (30), turns in a direction opposite to the disk (30), on account of a decoupling action provided by the thrust bearing (33).

7. The aircraft according to claim 6, wherein, within said inner disk (30), an inner shaft (32) turns freely and in an opposite direction to said inner disk (30), without any mechanical interference, the translational movement of the outer ring (31) remains always identical to the translational movement of the bottom flange (21), further articulated tie rods (34, 35) anchored to the outer ring (31), the further articulated tie rods (34, 35) actuated by the first non-oscillating disk (27) and following both rotation and axial translation of the first non-oscillating disk (27) to simultaneously bring about an identical displacement on trailing edge of the blades of the top and bottom rotors (4, 5).

8. The aircraft according to claim 2, wherein, said collective pitch variation control (9) produces the simultaneous and equivalent variation of the incidence of all the blades of the rotors (4, 5) for positive incidence of leading angles of the blades reaches values greater than or equal to 12°, and for negative incidence of the leading angles reaches values higher than 45°, said collective pitch variation control (9) comprises a collective-pitch control lever (9) and two rotating, but non-oscillating, disks (27, 31), arranged to vary inclination of the blades of the rotors (4, 5), said rotating, but non-oscillating, disks (27, 31) being positioned in proximity of the rotors, said rotating, but non-oscillating, disks (27, 31) sliding on respective shafts by transmissions coming from the control lever (9).

9. The aircraft according to claim 2, wherein, the blades of the rotors (4, 5) are each equipped with a corresponding and separate end mass having an aerodynamic shape, the end masses each having i) a first end and ii) a second, opposite end, the first and second ends corresponding to edges of the corresponding blade, the end masses stiffened the blades by centrifugal force during rotation, the end masses enabling the rotors to accumulate a greater amount of kinetic energy duration rotation.

10. The aircraft according to claim 1, wherein, said two governing surfaces (2, 3) placed in the back part of the aircraft connected to control element (8) are defined by two lateral rear ailerons (2 and 3) arranged in a rear part of the fuselage, symmetrically with respect to a longitudinal axis of the aircraft, with respective axes of rotation lying in horizontal plane passing through a center of a gravity of the aircraft, the third governing surface is defined by a third, front aileron (1) positioned at a prow of the aircraft, on the longitudinal axis of the aircraft, the third aileron (1) having an axis of rotation lying in the horizontal plane passing through the center of gravity of the machine, the control element (8) is a joystick (8) and movement of the two lateral rear ailerons (2, 3) is governed by the pilot through the joystick (8), which joystick performs only the function to move said two lateral rear ailerons with respect to each other in order to produce a pitching movement of the whole aircraft, the attitude and direction flight control further comprises two pedals (10-11) operatively connected to said front aileron (1), said front aileron being actuated by the pilot by operation of the pedals (10-11), the pedals performing the single and specific function of actuating said front aileron, said three ailerons (1, 2, 3) are placed underneath the rotors (4, 5), in a horizontal plane parallel to a fixed plane of rotation of the rotors and passing through the center of gravity of the aircraft, and in conditions of fixed-point stationary flight a wing chord of said ailerons is kept parallel to the axis of rotation of the rotors (4, 5).

11. The aircraft according to claim 10, wherein, a kinematic control chain connects the control lever (8) and the two rear ailerons (2, 3), management of the lateral attitude is controlled by the two rear ailerons (2, 3), and instantaneous position of the two rear ailerons (2, 3) is determined by the pilot moving the control lever (8) through the kinematic control chain.

12. The aircraft according to claim 11, wherein, the kinematic control chain connecting the control lever (8) and the two rear ailerons (2, 3) comprises two specular kinematic control chains actuated by the control lever (8) via a respective right-hand half-shaft (41) and left-hand half-shaft (42), each of the right-hand half-shaft (41) and left-hand half-shaft (42) rigidly connected to a corresponding outer bevel gear (43, 44), movement applied by the pilot on the control lever (8) reaches the ailerons (2, 3) through the two specular kinematic control chains actuated by the control lever (8), the control lever (8) is fixed to a vertical L-shaped bracket (36), on which L-shaped bracket (36) a central bevel gear (38) is fixed via a shaft that freely traverses a horizontal C-shaped bracket (37), the C-shaped bracket (37) having a central bevel gear (38) that always meshes with two lateral bevel gears (39, 40), which are coaxial and opposed to one another, the control lever (8) is turnable forwards and backwards about an axis of rotation of the two lateral bevel gears (39, 40), about an axis of the central bevel gear (38), said lateral bevel gears (39, 40) are fixed with respect to an end of the respective right-hand half-shaft (41) and left-hand half-shaft (42), the lateral bevel gears (39, 40) meshing with the central bevel gear (38) being ensured by said C-shaped bracket (37), the right-hand and left-hand half-shafts (41, 42) are free to turn with respect to the C-shaped bracket (37).

13. The aircraft according to claim 12, wherein, said outer bevel gears (43, 44) in turn move transmission bevel gears (45, 46) respectively, governing longitudinal rods (47, 48), the longitudinal rods (47, 48), via constant-velocity universal joints (49, 50) and further transmission rods (51, 52), transmit, respectively, to the right-hand aileron (2) and left-hand aileron (3), commands generated by the control lever (8), by movement of the control lever (8) forwards and backwards longitudinally, the respective top leading edges of the rear ailerons (2, 3) approach one another and move away from one another and the bottom leading edges of the rear ailerons (2, 3) move away from one another and approach one another, by movement of the control lever (8) to the right/left transversely the two rear ailerons (2, 3) move with concordant motion but in the opposite direction to the direction in which the lever itself is moved, and other movement of the control lever (8) being a vector sum of components of the displacement along longitudinal and transverse reference axes.

14. The aircraft according to claim 10, wherein, said two pedals comprise a right-hand pedal (10) and a left-hand pedal (11), the pedals (10, 11) moved by the pilot's feet, said pedals connected to corresponding L-shaped brackets (49, 50) and transverse arms (51, 52) of a pantograph parallelepiped;

a central bevel gear (53) is provided, fixed with respect to one of the transverse arms (52), the central bevel gears moves a bevel gear (54) and thereby a shaft (55) for rotation of the front aileron (1), i) pushing the right-hand pedal (10) forward inclines the top leading edge of the front aileron (1) to the right, and ii) pushing the left-hand pedal (11) forward inclines the top leading edge of the front aileron (1) to the left, thus obtaining when the control lever (8) is kept at center, turning of the aircraft on the aircraft's axis of yaw on the side of the pedal that is pushed forward.

15. The aircraft according to claim 1, wherein the blades of the rotors (4, 5) are equipped with additional end masses having an aerodynamic shape corresponding to a cross-section shape of the blades and opposite ends corresponding to edges of the blades, which, enable the rotors to accumulate a greater amount of kinetic energy.

16. The aircraft according to claim 1, further comprising:

two counter-rotating coaxial shafts, each of the coaxial shafts controlling a respective one of the rotors (4, 5), one engine, one transmission, a decoupling chain present between the engine and the coaxial shafts for controlling the rotors, and one train of gears that reverses a direction of rotation of the coaxial shafts.

17. The aircraft according to claim 1, wherein, said collective pitch variation control (9) produces the simultaneous and equivalent variation of the incidence of all the blades of the rotors (4, 5) for positive incidence of leading angles of the blades reaches values greater than or equal to 12°, and for negative incidence of the leading angles reaches values higher than 45°, said collective pitch variation control (9) comprises a collective-pitch control lever (9) and two rotating, but non-oscillating, disks (27, 31), arranged to vary inclination of the blades of the rotors (4, 5), said rotating, but non-oscillating, disks (27, 31) being positioned in proximity of the rotors, said rotating, but non-oscillating, disks (27, 31) sliding on respective shafts by transmissions coming from the control lever (9).

* * * * *

UNITED STATES PATENT AND TRADEMARK OFFICE
CERTIFICATE OF CORRECTION

PATENT NO. : 8,556,207 B2  Page 1 of 1
APPLICATION NO. : 13/057280
DATED : October 15, 2013
INVENTOR(S) : Gianni Cilli It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 235 days.

Signed and Sealed this

Fifteenth Day of September, 2015

Michelle K. Lee
*Director of the United States Patent and Trademark Office*